United States Patent [19]

Aske

[11] 4,145,929
[45] Mar. 27, 1979

[54] LINEAR ACCELEROMETER WITH IMPROVED MAGNETIC REBALANCE SYSTEM

[75] Inventor: Vernon H. Aske, Hopkins, Minn.
[73] Assignee: Honeywell Inc., Minneapolis, Minn.
[21] Appl. No.: 835,273
[22] Filed: Sep. 21, 1977
[51] Int. Cl.² .............................................. G01P 15/08
[52] U.S. Cl. .................................................. 73/517 B
[58] Field of Search ...................... 73/514, 515, 516 R, 73/517 R, 517 B; 267/161, 162, 154, 158

[56] References Cited

U.S. PATENT DOCUMENTS

| | | | |
|---|---|---|---|
| 2,591,921 | 4/1952 | Cosgriff et al. | 73/517 B |
| 3,120,130 | 2/1964 | Cohen | 73/517 B |
| 3,536,315 | 10/1970 | Jenkin | 267/161 |

Primary Examiner—James J. Gill
Attorney, Agent, or Firm—Charles L. Rubow

[57] ABSTRACT

Linear acceleration responsive apparatus is disclosed wherein a sensing mass or bobbin is suspended so that a pair of series connected, oppositely wound circumferential coils thereon are positioned in oppositely directed radial magnetic fields produced by permanent magnet means. The bobbin is supported by hinge assemblies which also serve as flex leads and variable capacitance position pickoff means. A rebalance current is supplied to the coils by a servo amplifier in response to the pickoff signal. The magnetic flux components resulting from the rebalance current are equal and oppositely directed, thereby precluding any effect on the radial magnetic fields.

20 Claims, 8 Drawing Figures

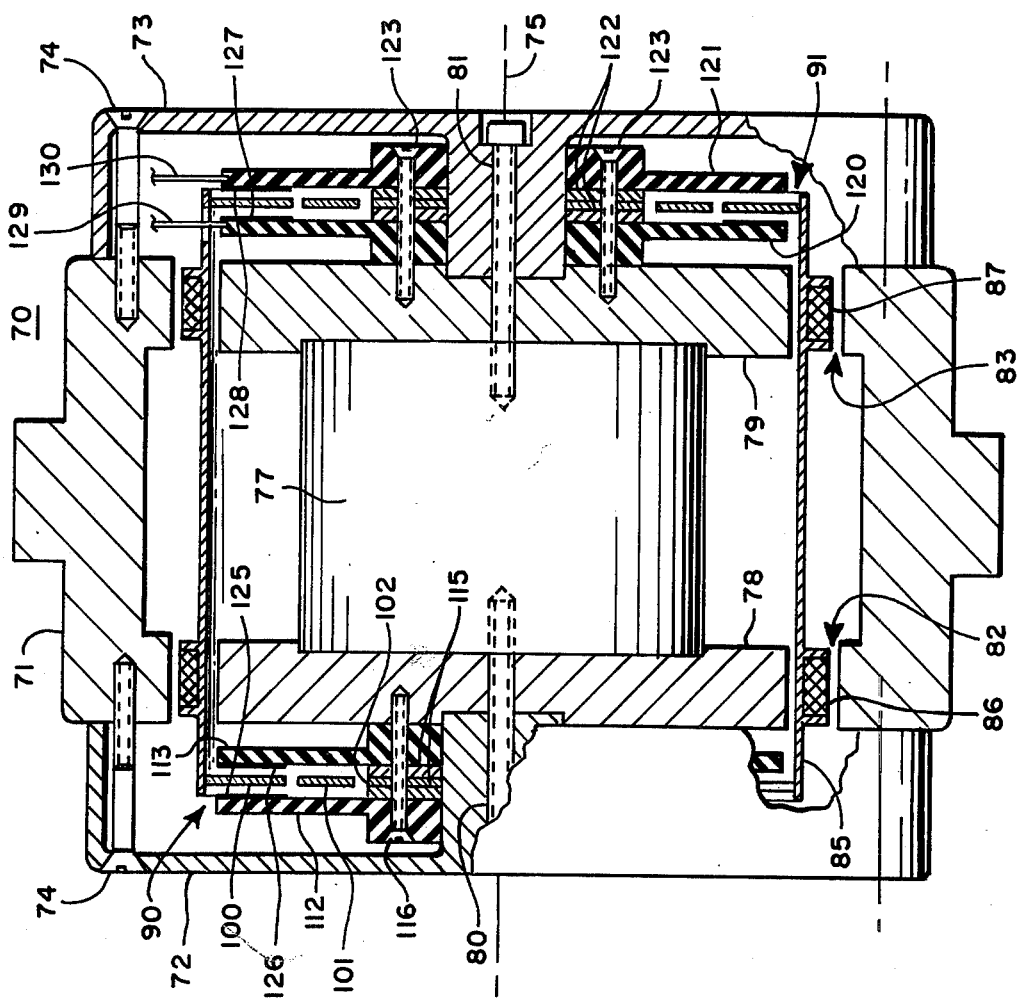
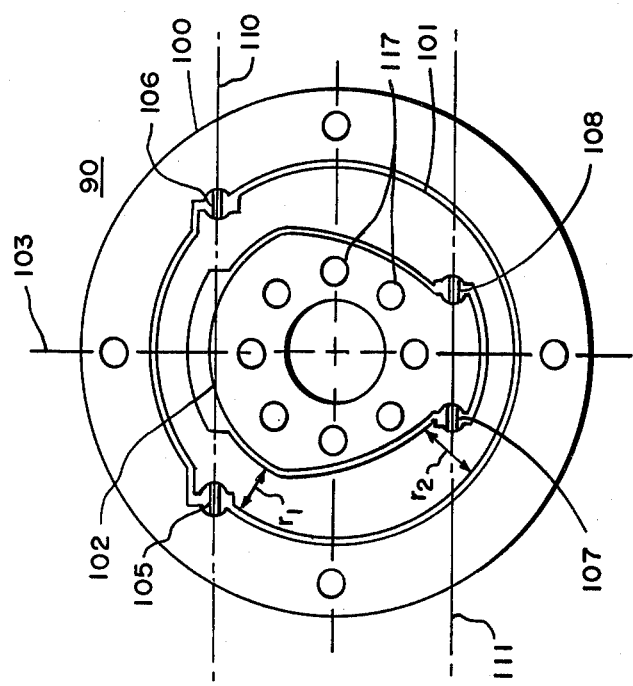

LINEAR ACCELEROMETER WITH IMPROVED MAGNETIC REBALANCE SYSTEM

BACKGROUND OF THE INVENTION

The present invention relates generally to acceleration responsive devices, and more specifically to an improved permanent magnet/moving coil rebalance system for linear accelerometers.

Acceleration responsive devices perform essential sensing functions in a wide variety of systems. As performance requirements and available technology have advanced, the demand has increased for sensors characterized by much improved sensitivity, stability, accuracy, linearity of response, reliability and ruggedness, in addition to fast reaction time and low cost. Implicit in the stability, sensitivity and response linearity requirements is a requirement that precision be maintained over a wide temperature range. The present state of the art is such that it has been difficult to achieve improvements in all of the foregoing characteristics simultaneously, or, in some instances, even to achieve improvement in one characteristic without adversely affecting another. Nevertheless, requirements exist, particularly in aircraft navigation and missile guidance systems, for a single acceleration sensor with superior performance in all of the noted areas.

One of the functions which must be provided for in an accelerometer is that of returning the acceleration sensing mass to its desired rest position after it has been displaced by an acceleration. This function will hereinafter be referred to as rebalancing the accelerometer. A variety of rebalance system variations have been devised and are presently employed. In the simplest, lower accuracy accelerometers, the resilience or spring constant of various materials has been relied on to produce rebalancing forces. Inertia has also been relied on to provide the rebalancing forces in certain types of accelerometers, such as the pendulous gyro accelerometer. Other more sophisticated and accurate accelerometers have employed permanent magnet/moving coil and electrostatic rebalance systems.

Permanent magnet/moving coil rebalance systems have shown considerable promise in simultaneously meeting the performance and low cost requirements. However, one feature of the permanent magnet/moving coil type of rebalance system that results in nonlinear response arises from the need to vary the coil current as the function of input acceleration in order to maintain balance. In conventional systems, this variable coil current produces a variable magnetomotive force which reenforces or opposed the magnetic field produced by the permanent magnet, and thus affects the magnetic flux density in the region in which the coil is located. Variations in the flux density result in response linearity errors in operation of the accelerometer, particularly at high input accelerations.

A known technique for reducing such errors is to provide two magnetic circuits arranged so that the coil current increases the flux density in one magnetic circuit and simultaneously decreases the flux density in the other circuit. Although such a system is theoretically effective in eliminating nonlinear response due to rebalance current in the coil, it requires magnetic circuits having identical temperature sensitivities. In addition, the magnetic circuits otherwise must be substantially identical for this arrangement to be effective. As a practical matter, it is difficult to produce two magnetic circuits which are adequately matched over a wide temperature range. Further, it has been found difficult to provide adequate compensation for nonlinear response produced by the rebalance current in conventional permanent magnet/moving coil rebalance systems.

A further problem which must be dealt with in achieving a satisfactory rebalance system for high performance accelerometers involves the relationship between the mechanical null position of the sensing mass suspension system and the electrical null position of the pickoff system. Precision over a wide temperature range dictates minimum changes in null bias and scale factor with changes in temperature. Null bias is dependent on both elastic restraint along the input axis and displacement between the mechanical and electrical null positions. Stability is predominantly the result of a stable relationship between the mechanical and electrical nulls.

Lack of null bias stability can result from physical movement of the suspension or pickoff null position, or electrical changes in the pickoff or its associated circuitry. Obviously, any interface between the suspension and pickoff systems is a potential source of change in the null bias. Change in null bias in a pendulous accelerometer is usually also accompanied by a change in alignment of motion of the sensing mass relative to the input axis. These problems may be minimized by providing a stable and linear (non-pendulous) suspension system and a stable pickoff system, and by minimizing interfaces between the suspension and pickoff systems.

The applicant has avoided the above-described problems by providing a unique single permanent magnet/-double moving coil rebalance system with a variable capacitance pickoff in which common elements are used both to suspend the sensing mass and to serve as moveable plates of position sensing capacitors. This arrangement eliminates any net effect of coil generated magnetomotive forces on the field produced by the permanent magnet, and eliminates all interfaces between the suspension and pickoff systems. In accordance with these features, linear accelerometers employing the applicant's rebalance system design have been found to provide performance and reliability heretofore unavailable from simple low cost apparatus.

SUMMARY OF THE INVENTION

The invention herein set forth is a linear accelerometer rebalance system basically comprising permanent magnet means for producing a pair of oppositely directed radial magnetic fields and a suspended sensing mass or bobbin carrying a pair of oppositely wound coils positioned so that one coil is located in each magnetic field. The rebalance system includes pickoff means having elements in common with the system which suspends the bobbin and a servo amplifier for supplying rebalance current to the coils on the bobbin in response to the pickoff signal. The pickoff means may comprise first and second moveable capacitor plates which form parts of first and second suspension assemblies at the ends of the bobbin, and which are each positioned between a pair of fixed capacitor plates so as to form four variable capacitors. The variable capacitors may be connected in a four active element bridge which supplies a position signal to the servo amplifier.

Accordingly, the primary object of this invention is to provide a linear accelerometer rebalance system capable of facilitating superior accelerometer performance.

A further object of this invention to provide a unique single permanent magnet/double moving coil accelerometer rebalance system characterized by exceptionally linear response.

A further object is to provide a unique permanent magnet/moving coil accelerometer rebalance system in which rebalance current does not affect the strength of magnetic fields in which coils are located.

A further object is to provide a linear moving coil accelerometer rebalance system with minimum interfaces between the coil suspension and position pickoff systems.

A further object is to provide a linear moving coil accelerometer having variable capacitance position pickoff means in which the moveable plates of the variable capacitors comprise portions of the coil suspension system.

Yet a further object is to provide a linear accelerometer rebalance system having position pickoff means comprising four variable capacitors connected in a four active element bridge circuit.

Additional objects of the invention may be ascertained from a study of the diclosure, drawings and appended claims.

BRIEF DESCRIPTION OF THE DRAWINGS

FIG. 5 is an cross-sectional view of a second embodiment of a linear accelerometer with a single permanent magnet/double moving coil rebalance system, and a suspension assembly and variable capacitance pickoff means of a second design in accordance with the applicant's invention;

FIG. 6 is a plan view of a suspension assembly and pickoff means of the design used in the accelerometer of FIG. 5;

DESCRIPTION OF THE PREFERRED EMBODIMENTS

Figure 1:
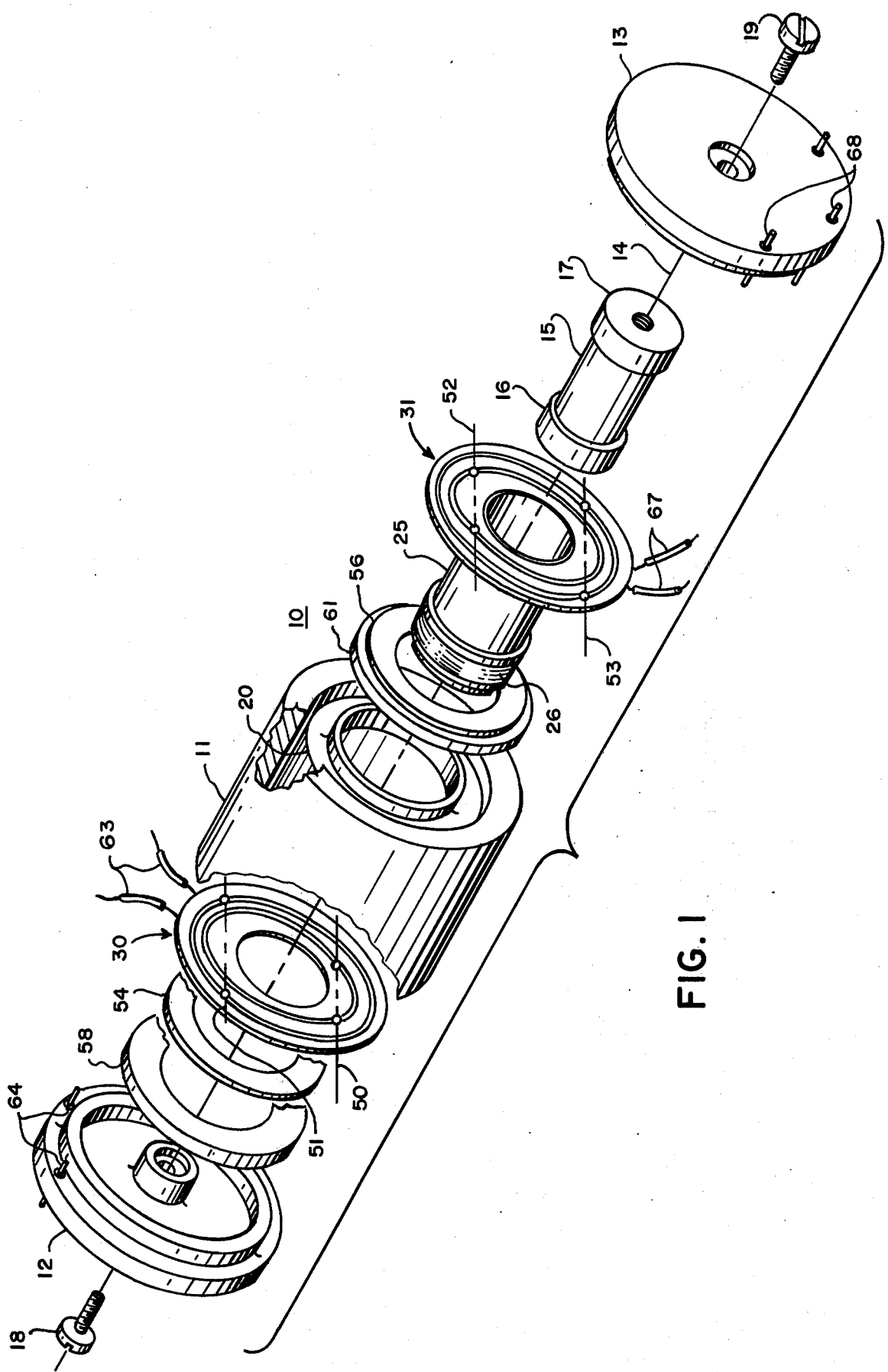
FIG. 1 is an exploded view of a first embodiment of a linear accelerometer with a single permanent magnet/double moving coil rebalance system, and a suspension assembly and variable capacitance pickoff means of a first design in accordance with the applicant's invention.
Figure 2:
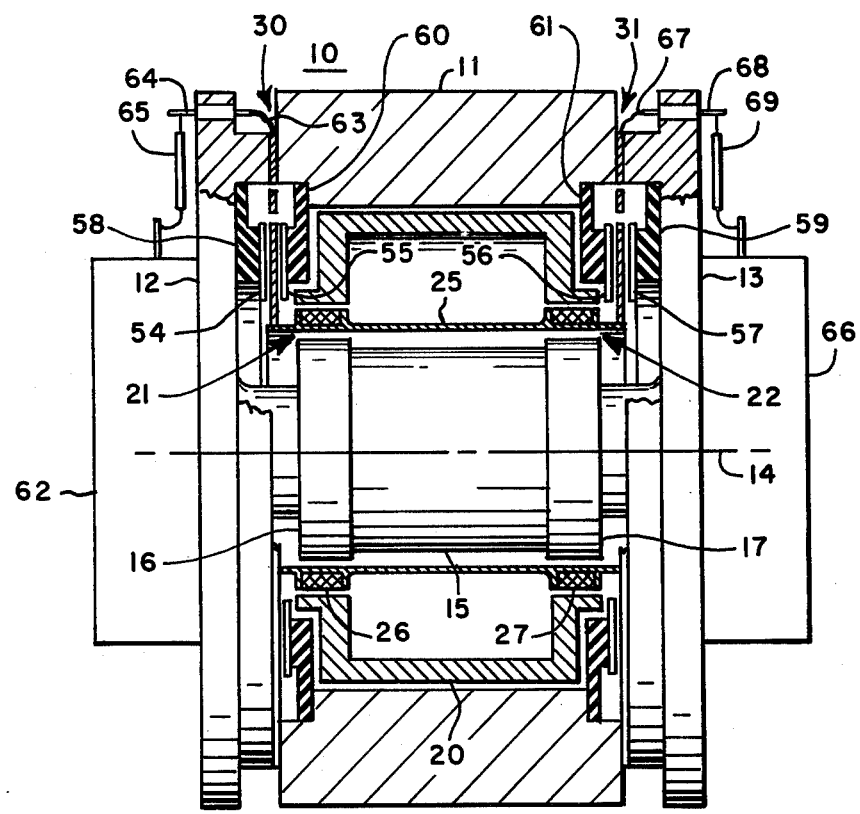
FIG. 2 is an assembled cross-sectional view of the linear accelerometer shown in FIG. 1.

In FIGS. 1 and 2, reference numeral 10 generally indentifies a first embodiment of a linear accelerometer employing a unique rebalance system in accordance with the present invention. Accelerometer 10 includes a housing comprising a basically tubular center section 11 and a pair of end caps 12 and 13. End caps 12 and 13 are attached to center section 11 by suitable fasteners (not shown), such as a plurality of bolts or screws extending through each end cap around its periphery and into an end wall of the center section. The housing is aligned with an input axis 14 along which accelerometer 10 is sensitive to acceleration.

A cylindrical permanent magnet 15 is contained within the housing, and is fitted with a pair of pole pieces 16 and 17. Magnet 15 and pole pieces 16 and 17 are fixed in a central position within the housing by means of screws or bolts 18 and 19 extending through end caps 12 and 13 respectively. An annular magnetic flux return path structure or sleeve 20 of magnetically permeable material is fitted within center housing section 11 around permanent magnet 15 and pole pieces 16 and 17 so as to provide a pair of annular gaps 21 and 22 in the magnetic circuit. Gaps 21 and 22 comprise a pair of series gaps in the magnetic circuit, with magnetic flux lines directed radially outward through one of the gaps and radially inward through the other gap.

An acceleration sensing bobbin or mass 25 of tubular form is positioned between the magnet-pole piece assembly 15–17 and sleeve 20. First and second circumferential coils 26 and 27 are carried on bobbin or mass 25 in the areas within gaps 21 and 22 respectively. Coils 26 and 27 in cooperation with the magnetic circuit comprise portions of a force rebalance system for normally maintaining bobbin 25 at a predetermined location along input axis 14. The dimension of coils 26 and 27 parallel to axis 14 is slightly less than the corresponding dimension of pole pieces 16 and 17 and adjacent inwardly projecting portions of sleeve 20. As a result, the magnetic fields acting on coils 26 and 27 are substantially uniform over the entire range of positions of bobbin 25. Such an arrangement is more fully disclosed in U.S. Pat. No. 3,152,275 issued Oct. 6, 1964 to the same applicant and assigned to the same assignee as the present application.

Bobbin 25 is mechanically suspended within the housing of accelerometer 10 by means of a pair of planar disk-shaped suspension assemblies generally identified by reference numerals 30 and 31. Suspension assemblies 30 and 31 are disclosed in detail in U.S. Pat. application Ser. No. 835,274 for Linear Accelerometer with Torsion Hinge Suspension filed concurrently herewith in the name of the same applicant and assigned to the same assignee as the present application. Reference may be made to the concurrently filed application for a full description of the structural and operational aspects of the suspension assemblies. However, the following abridged description is presented to facilitate an understanding of the present accelerometer rebalance system.

Each suspension assembly is a laminate structure having two identical outer layers of laminae and an inner pair of symmetrical coplanar laminae. The outer layers each compirse three generally concentric rings. The inner layer comprises a pair of symmetrical portions each including an outer flange section, an intermediate arm and an inner flange section. Each intermediate arm is joined to its adjacent outer flange section by means of a first torsion member, and to its adjacent inner flange section by means of a second torsion member. Corresponding torsion members in each of the two portions of the inner laminae are located along parallel axes. The two portions of the inner laminae together have a size and general configuration similar to the outer laminae, and are bonded between and electrically insulated from the outer laminae. Accordingly the outer laminae serve to stiffen all of the inner laminae except for the torsion members.

Figure 4:
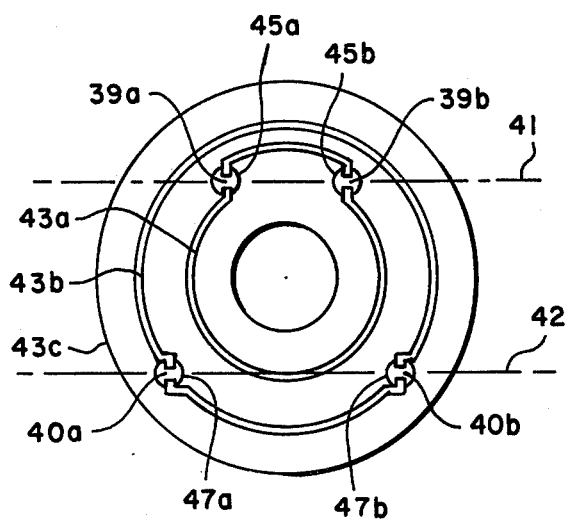
FIG. 4 is a plan view of the suspension assembly and pickoff means of FIG. 3.
Figure 3:
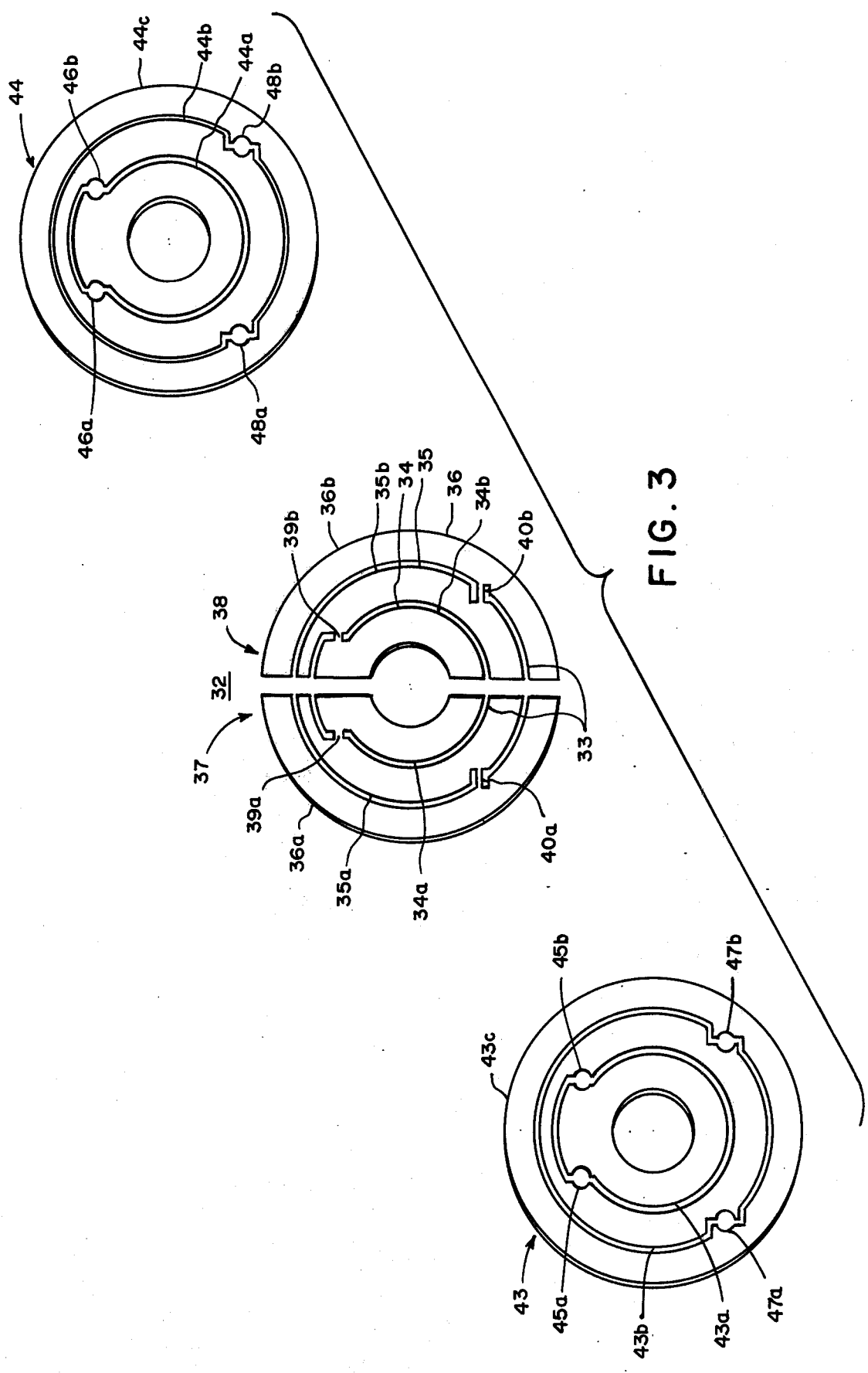
FIG. 3 is an exploded view of a suspension assembly and variable capacitance pickoff means of the design used in the accelerometer of FIGS. 1 and 2.

A suspension assembly of the design employed in the accelerometer embodiment of FIGS. 1 and 2 is shown in greater detail in FIGS. 3 and 4. Reference numeral 32 generally identifies an inner disk which is separated by arcuate slits 33 into inner, intermediate and outer rings 34, 35 and 36, and further separated into a pair of symmetrical coplanar laminae generally identified by reference numerals 37 and 38. Specifically, inner ring 34 comprises a pair of inner flange sections 34a and 34b. Intermediate ring 35 comprises a pair of intermediate arms 35a and 35b. Outer ring 36 comprises a pair of outer flange sections 36a and 36b. Intermediate arms 35a and 35b are joined with adjacent inner flange sections 34a and 34b by torsion members 39a and 39b respectively, and with outer flange sections 36a and 36b by torsion members 40a and 40b respectively.

Accordingly, inner and outer flange sections 34a and 36a, intermediate arm 35a and torsion members 39a and 40a are integral portions of lamina 37. Inner and outer flange sections 34b and 36b, intermediate arm 35b and torsion members 39b and 40b are integral portions of lamina 38. As shown in FIG. 4, torsion members 39a and 39b comprise torsion hinge means aligned with a first hinge axis 41. Torsion members 40a and 40b comprise torsion hinge means aligned with a second hinge axis 42 parallel with axis 41.

Disk 32 is bonded between a pair of disks generally identified by reference numerals 43 and 44, each separated into three generally concentric laminar ring members having the same basic size and configuration as rings 34, 35 and 36. Specifically, ring 34 is bonded between a pair of ring members 43a and 44a. Ring 35 is bonded between ring members 43b and 44b. Ring 36 is bonded between ring members 43c and 44c. Ring members 43a–c and 44a–c are configured so as to provide enlarged apertures 45a, 45b, 46a, 46b, 47a, 47b, 48a and 48b around torsion members 39a, 39b, 40a and 40b. Accordingly, ring members 43a–c and 44a–c entirely cover inner disk 32 except for the torsion members. For reasons which will hereinafter be discussed, rings 34–36 are bonded between ring members 43a–c and 44a–c with a nonconductive material so that the inner rings are electrically insulated from the outer ring members.

As shown in FIG. 1, a central hole in each of suspension assemblies 30 and 31 is sized to slip over the outer ends of bobbin 25. The inner rings of the suspension assemblies are rigidly attached to the bobbin by any suitable means, such as with a bead of epoxy cement. The outer ring of suspension assembly 30 is clamped between end cap 12 and center section 11 of the housing. Similarly, the outer ring of suspension assembly 31 is clamped between end cap 13 and section 11.

As also illustrated in FIG. 1, suspension assembly 30 is positioned so that its torsion members are aligned with hinge axes 50 and 51 corresponding to axes 41 and 42 respectively in FIG. 4. Suspension assembly 31 is positioned so that its torsion members are aligned with hinge axes 52 and 53 corresponding to axes 41 and 42 respectively. Axes 50 and 51 lie in a first plane perpendicular to input axis 14, and are equidistant from axis 14 on opposite sides thereof. Axes 52 and 53 are parallel with axes 50 and 51, equidistant from axis 14 on opposite sides thereof, and lie in a second plane perpendicular to axis 14. Corresponding hinge axes (i.e., axes 50 and 52 and axes 51 and 53) lie on opposite sides of axis 14.

The inner ring members of each of suspension assemblies 30 and 31 form a moveable plate of variable capacitance pickoff means for producing a signal indicative of the position of bobbin 25 relative to the accelerometer housing. The moveable plate of each suspension assembly is positioned between a pair of fixed capacitor plates mounted on the housing. Specifically, the moveable plate of assembly 30 is positioned between fixed plates 54 and 55. The moveable plate of assembly 31 is positioned between fixed plates 56 and 57. Fixed plates 54 and 57 are mounted on insulating rings 58 and 59 in end caps 12 and 13 respectively. Fixed plates 55 and 56 are mounted on insulating rings 60 and 61 in opposite ends of center housing section 11. Such an arrangement effectively provides four variable capacitors, one between each side of each moveable plate and the adjacent fixed plate. As will hereinafter be described, the variable capacitors may be connected to form a four active element bridge circuit for detecting movement of bobbin 25 with a high degree of sensitivity.

The inner laminae of suspension assembly 30 are adapted to carry electric current to coils 26 and 27. Specifically, the inner flange sections of the inner laminae may be connected to the coils. The outer flange sections may be connected to a servo amplifier in an electronic circuit package 62 through electrical jumpers 63, feed through devices 64 and jumpers 65. Similarly, the inner laminae of suspension assembly 31 are adapted to carry electrical signals to and/or from the moveable capacitor plates of the suspension assemblies. The inner flange sections may be connected to the capacitor plates, and the outer flange sections connected to a capacitance bridge excitation supply in an electronic circuit package 66 through jumpers 67, feed through devices 68 and jumpers 69. As previously indicated, the inner laminae of the suspension assemblies are electrically insulated from each other and from the outer ring members of the suspension assemblies, and are adapted to serve as four flex leads.

The accelerometer embodiment shown in FIG. 5 differs from the accelerometer embodiment of FIGS. 1 and 2 primarily in the design of the suspension assemblies. The differences in design allow for locating the suspension assemblies within the bobbin in the embodiment of FIG. 5 in contract to locating the suspension assemblies outside the bobbin in the embodiment of FIGS. 1 and 2. A further difference inherent in this design is that the outer and inner rings of the suspension assemblies are respectively attached to the bobbin and the housing in contrast to the opposite arrangement in the embodiment of FIGS. 1 and 2.

The accelerometer embodiment of FIG. 5 is generally identified by reference numeral 70, and includes a housing having an annular center section 71 which also serves as a magnetic flux return path. End caps 72 and 73 are attached to opposite ends of the center section 71 by means of a plurality of screws 74 extending through each end cap around its periphery and into an end wall of the center section. The housing is aligned with an input axis 75 along which accelerometer 70 is sensitive to acceleration.

A cylindrical permanent magnet 77 is contained within the housing, and is fitted with a pair of pole pieces 78 and 79. Magnet 77 and pole pieces 78 and 79 are attached to the housing by means of screws or bolts 80 and 81. Magnet 77, pole pieces 78 and 79 and surrounding housing 71 are arranged to provide a pair of annular gaps 82 and 83 with magnetic flux lines directed radially outward through one of the gaps and radially inward through the other gap.

An acceleration sensing bobbin or mass 85 similar to bobbin or mass 25 is suspended between the magnet-pole piece assembly 77–79 and housing section 71. First and second circumferential coils 86 and 87, in cooperation with the magnetic circuit, comprise portions of a force rebalance system for normally maintaining mass 85 at a predetermined location along input axis 75.

Bobbin 85 is suspended by means of a pair of identical planar disk-shaped suspension assemblies generally identified by reference numerals 90 and 91. Suspension assembly 90 is shown in greater detail in FIG. 6, and is structurally similar to suspension assemblies 30 and 31. It comprises three layers of laminae of which the two outer layers are identical. As seen in FIG. 6, the outer layers each comprise three generally concentric coplanar ring members, including an outer ring member 100, an intermediate ring member 101 and an inner ring member 102. As described for suspension assemblies 30 and 31, the inner layer of laminae comprises two separated sections lying on opposite sides of axis 103 in FIG. 6, and symmetrical with respect to the axis.

Except for the separation between the sections and torsion members 105, 106, 107 and 108, the inner and outer layers of suspension assembly 90 are substantially identically configured in planes perpendicular to axis 75. Torsion members 105 and 106 comprise torsion hinge means aligned with a hinge axis 110. Torsion members 107 and 108 comprise a torsion hinge means aligned with a hinge axis 111 which is parallel with hinge axis 110. As can be seen from FIG. 6, the suspension assemblies are configured such that intermediate arms formed by the portions of the intermediate ring between hinge axes 110 and 111 vary in radial dimension from a minimum dimension $r_1$ adjacent one torsion hinge means to a maximum dimension $r_2$ adjacent the other hinge means.

The outer rings of suspension assemblies 90 and 91 are sized to fit within the ends of bobbin 85 and are rigidly attached thereto. The inner ring of assembly 90 is clamped between a pair of insulating support disks 112 and 113 and a pair of spacers 115 by a plurality of screws 116. The inner ring of suspension assembly 91 is similarly clamped between a pair of insulating disks 120 and 121 and a pair of spacers 122 by a plurality of screws 123.

As described in connection with the accelerometer embodiment of FIGS. 1 and 2, the inner laminae in the intermediate rings of the suspension assemblies are adapted to serve as flex leads for carrying electrical signals between moving and stationary portions of the accelerometer. Two flex leads, such as those formed by the inner laminae of the intermediate ring in assembly 90 may be used to carry current to coils 86 and 87 on bobbin 85. The inner laminae of the intermediate ring in assembly 91 may be used to carry electrical signals to the outer ring members of assemblies 90 and 91 which form moveable plates of variable capacitance pickoff means. The moveable plate formed by the ring members of assembly 90 is positioned between a pair of fixed capacitor plates 125 and 126 carried on insulating disks 112 and 113 respectively. Identical fixed capacitor plates 127 and 128 are positioned adjacent opposite sides of the outer ring of suspension assembly 91 by means of insulating disks 120 and 121 respectively. Conductors 129 and 130 are shown for carrying electrical signals to fixed capacitor plates 127 and 128. Similar conductors (not shown) may be provided for carrying electrical signals to capacitor plates 125 and 126.

Figure 7:
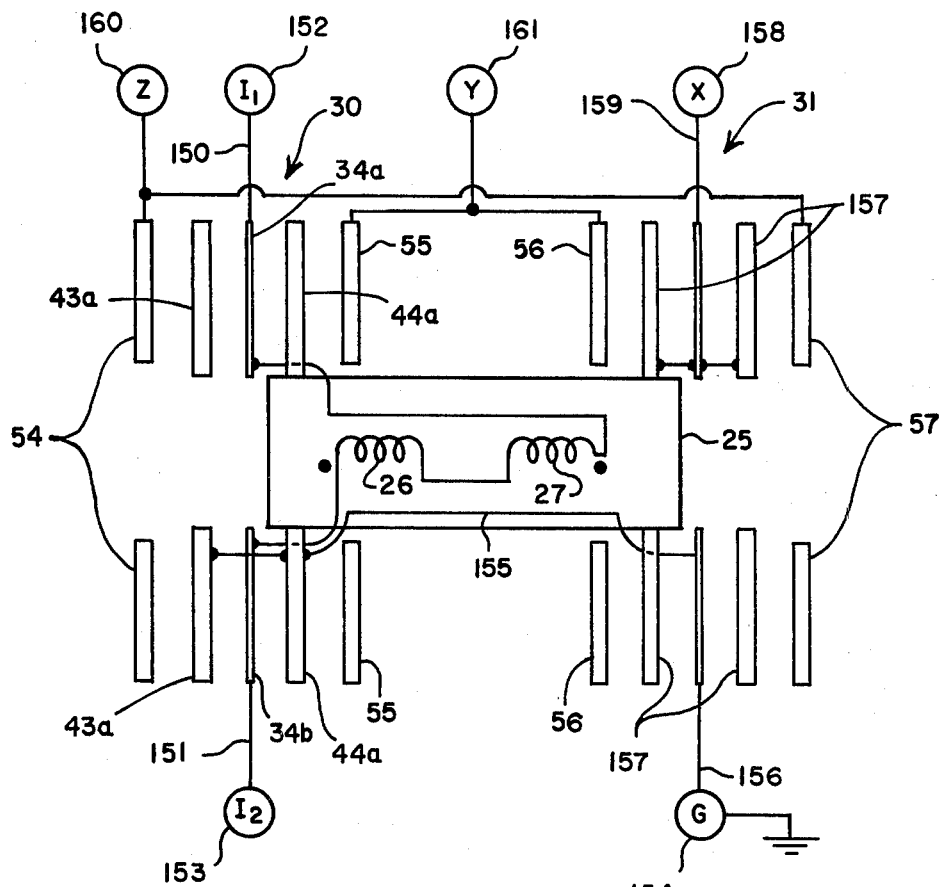
FIG. 7 is a schematic diagram illustrating how the elements of the applicant's suspension assemblies and pickoff means cooperate to suspend a sensing mass or bobbin in an accelerometer, produce a signal indicative of bobbin position and carry position signals and rebalance current.

The manner in which the various elements in the suspension assemblies can be connected to provide a four active element variable capacitance position pickoff, and to serve as flex leads for the moving electrical components in an accelerometer is illustrated in FIG. 7. For purposes of relating the schematic diagram of FIG. 7 to the illustrated accelerometers, the various elements in FIG. 7 are numbered to correspond with numbering in FIGS. 1 and 2. Bobbin 25 is shown carrying coils 26 and 27 which are connected in series and wound in directions as indicated by the dot notation. This arrangement results in generation of self cancelling magnetomotive forces by current in the coils. Coils 26 and 27 are connected between the inner laminae 37 and 38 of suspension assembly 30, which, in cooperation with conductor means identified by reference numerals 150 and 151, carry a rebalance current from terminals 152 and 153 of the servo amplifier in circuit package 62.

Flange sections 34a and 34b of suspension assembly 30 are bonded between laminar ring members 43a and 44a which form one moving plate of the variable capacitance position pickoff. This moving plate is connected to a zero reference potential source or ground 154 through a conductor 155, a first inner lamina of assembly 31 and conductor means 156. Accordingly, ring members 43a and 44a effectively shield remaining portions of the pickoff from the effects of current flowing through inner flange sections 34a and 34b to coils 26 and 27. A second moving capacitor plate comprising the outer ring members of assembly 31, and identified in FIG. 7 by reference numeral 157, is connected to a terminal 158 of the bridge excitation source in circuit package 66 through the second inner lamina of assembly 31 and conductor means 159. Fixed capacitor plates 54 and 57 are connected together at a bridge node 160. Fixed capacitor plates 55 and 56 are connected together at a bridge node 161.

Figure 8:
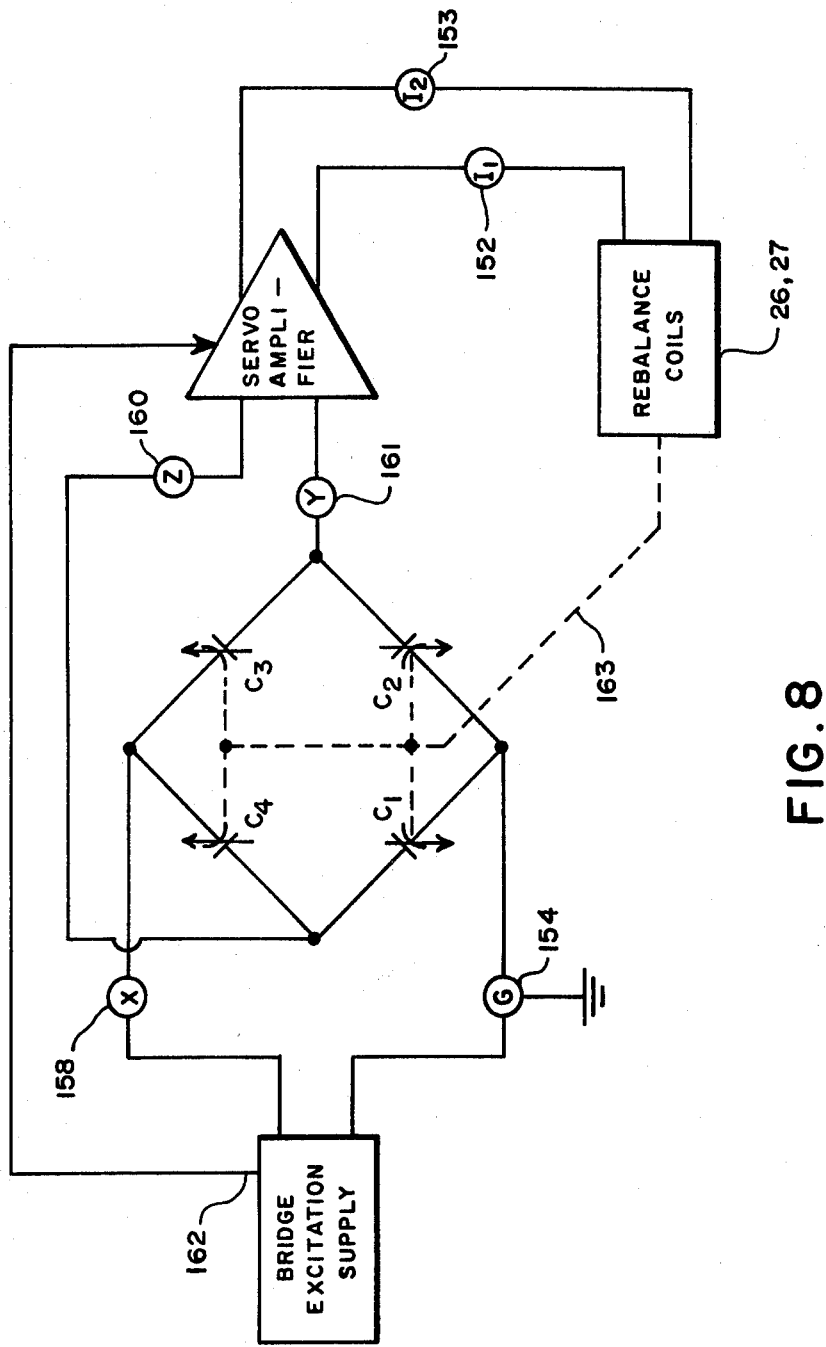
FIG. 8 is a block diagram of the rebalance system for the accelerometers shown in FIGS. 1, 2 and 5.

The block diagram of FIG. 8 illustrates the general operation of the applicant's accelerometer rebalance system. For exemplary purposes, the various elements illustrated in FIG. 8 are identified by the same reference numerals as corresponding elements in FIGS. 1, 2 and 7.

The four variable capacitors formed between fixed plate 54 and moveable plate 43a–44a, between movable plate 43a–44a and fixed plate 55, between fixed plate 56 and moveable plate 157 and between moveable plate 157 and fixed plate 57 are identified in FIG. 8 by reference symbols $C_1$, $C_2$, $C_3$ and $C_4$ respectively. Capacitors $C_1$–$C_4$ are connected in a four active element bridge circuit with bridge node 154 between capacitor $C_1$ and $C_2$ connected to ground. The bridge excitation supply in package 66, which has one terminal connected to bridge node 154 at zero reference potential, supplies a low distortion high frequency bridge excitation signal to bridge node 158 between capacitors $C_3$ and $C_4$. An excitation frequency of 100 KC has been found suitable for the applicant's rebalance system. The excitation supply also generates a reference signal at terminal 162 which is supplied to a demodulator in the servo amplifier in package 62.

The input terminals of the servo amplifier are connected to bridge nodes 160 and 161 between capacitors $C_1$ and $C_4$ and capacitors $C_2$ and $C_3$ respectively. In response to any bridge imbalance, the servo amplifier supplies a rebalance current to coils 26, 27 through terminals 152 and 153. The rebalance current in coils 26, 27 causes repositioning of the accelerometer bobbin and moveable capacitor plates as indicated by mechanical connection 163, thereby varying the capacitance of capacitors $C_1$-$C_4$ so as to rebalance the bridge.

In accordance with the foregoing description, the applicant has provided a unique accelerometer rebalance system including a four active element variable capacitance pickoff in which common elements are used both to suspend the sensing mass or bobbin and to serve as moveable plates in the capacitors. This arrangement eliminates all interfaces between the suspension and pickoff systems. It also inherently provides excellent temperature stability since all capacitors are identical and change in like manner with temperature. Linearity errors caused by current in the moveable rebalance coils is eliminated by a unique single permanent magnet/double moving coil arrangement. Accordingly, the principal sources of instability and nonlinear operation have been eliminated.

Although two embodiments of the applicant's accelerometer employing an improved rebalance system have been shown and described for illustrative purposes, other embodiments which do not depart from the teachings herein will be apparent to those skilled in the art. It is not intended that coverage be limited to the disclosed embodiments, but only by the terms of the appended claims.

The embodiments of the invention in which an exclusive property or right is claimed are defined as follows:

1. In acceleration responsive apparatus of the type including magnet means for producing a magnetic field in which is located a coil forming at least a portion of a sensing mass suspended for movement along an input axis fixed relative to the magnet means, a servo system for supplying current to the coil to maintain the sensing mass in a predetermined position along the input axis and pickoff means for supplying a signal indicative of displacement of the sensing mass from the predetermined position, improved force rebalance means for minimizing errors resulting from current in the coil, comprising:

a permanent magnet aligned with the input axis;
   a magnetically permeable sleeve concentric with said permanent magnet and substantially coextensive therewith along the input axis, said permanent magnet and said sleeve cooperating to define a first annular gap containing a substantially radial inwardly directed magnetic field and a second annular gap containing a substantially radial outwardly directed magnetic field;
   a tubular bobbin carrying first and second circumferential coils wound in opposite directions and connected in series;
   first and second torsion hinge means respectively located along first and second parallel hinge axes perpendicular to the input axis on opposite sides thereof, said first torsion hinge means being fixed relative to said permanent magnet and said second torsion hinge means being fixed relative to said tubular bobbin;
   first intermediate arm means joining said first and second torsion hinge means;
   third and fourth torsion hinge means respectively located along third and fourth parallel hinge axes on opposite sides of the input axis and parallel with the first and second hinge axes, said third torsion hinge means being fixed relative to said permanent magnet means and said fourth torsion hinge means being fixed relative to said tubular bobbin;
   second intermediate arm means joining said third and fourth torsion hinge means, whereby said tubular bobbin is constrained from movement transverse to the input axis;
   a servo system for producing a positioning current; and
   conductor means, including said first and second torsion hinge means and said first intermediate arm means, for carrying the positioning current to the first and second coils, the positioning current having no net effect on the magnetic flux in the first and second gaps because of the oppositely directed magnetic fluxes produced by current in the first and second coils.

2. The acceleration responsive apparatus of claim 1, wherein:
   the magnetic fields in the first and second annular gaps are substantially uniform over the extent of the gaps along the input axis; and
   the extent of each of the first and second coils along the input axis is shorter than the axial extent of each of the gaps.

3. The acceleration responsive apparatus of claim 2 wherein:
   said first torsion hinge means comprises first and second torsion hinge members spaced along the first hinge axis and connected to said permanent magnet means by first and second flange sections respectively;
   said second torsion hinge means comprises third and fourth torsion members spaced along the second hinge axis and connected to said tubular bobbin by third and fourth flange sections respectively; and
   said first intermediate arm means comprises a first intermediate arm joining the first and third torsion members, and a second intermediate arm joining the second and fourth torsion members.

4. The acceleration responsive apparatus of claim 3 wherein:
   said first and third torsion members, said first intermediate arm and said first and third flange sections are integral portions of a first lamina; and
   said second and fourth torsion members, said second intermediate arm and said second and fourth flange sections are integral portions of a second lamina.

5. The acceleration responsive apparatus of claim 4 wherein, in said first and second torsion hinge means:
   said first and second flange sections are bonded between and electrically insulated from first and second laminar ring members;
   said first and second intermediate arms are bonded between and electrically insulated from third and fourth laminar ring members;
   said third and fourth flange sections are bonded between and electrically insulated from fifth and sixth laminar ring members;
   said first and third torsion members, said first intermediate arm and said first and third flange sections of said first and second torsion hinge means form a first conductor;
   said second and fourth torsion members, said second intermediate arm means and said second and fourth flange sections of said first and second torsion hinge means form a second conductor; and said first and second conductors serve to carry positioning current to the first and second coils on said bobbin.

6. The acceleration responsive apparatus of claim 5 wherein:
said third torsion hinge means comprises first and second torsion members spaced along the third hinge axis and connected to said permanent magnet means by first and second flange sections respectively;
said fourth torsion hinge means comprises first and second torsion members spaced along the fourth hinge axis and connected to said tubular bobbin by third and fourth flange sections respectively; and
said second intermediate arm means comprises a first intermediate arm joining the first and third torsion members and a second intermediate arm joining the second and fourth torsion members.

7. The acceleration responsive apparatus of claim 6 wherein:
said first and second flange sections of said third and fourth torsion hinge means are bonded between and electrically insulated from first and second laminar ring members;
said first and second intermediate arms of said third and fourth torsion hinge means are bonded between and electrically insulated from third and fourth laminar ring members;
said third and fourth flange sections of said third and fourth torsion hinge means are bonded between and electrically insulated from fifth and sixth laminar ring members; and
said fifth and sixth laminar ring members in said first and second and said third and fourth torsion hinge means comprise moveable capacitor plates in variable capacitance pickoff means for supplying a position signal indicative of displacement of said tubular bobbin from the predetermined position.

8. The acceleration responsive apparatus of claim 7 wherein, in said second torsion hinge assembly:
said first and third torsion members, said first intermediate arm and said first and third flange sections form a third conductor;
said second and fourth torsion members, said second intermediate arm and said second and fourth flange sections form a fourth conductor; and
said third and fourth conductors serve to carry electrical signals from said moveable capacitor plates.

9. The acceleration responsive apparatus of claim 8 wherein said variable capacitance pickoff means comprises:
a first moveable capacitor plate located between first and second fixed capacitor plates to form first and second capacitors having capacitances which vary inversely as said bobbin moves along the input axis;
a second moveable capacitor plate located between third and fourth fixed capacitor plates to form third and fourth capacitors having capacitances which vary inversely as said bobbin moves along the input axis; and
means for electrically connecting said first, second, third and fourth capacitors in a bridge circuit for producing an output signal indicative of axial movement of said bobbin.

10. The acceleration responsive apparatus of claim 9 wherein the moveable capacitor plate comprising the fifth and sixth laminar ring members in said first and second torsion hinge means is maintained at a zero reference potential, whereby said bridge circuit is shielded from effects of positioning current carried to the first and second coils through said first and second conductors.

11. An accelerometer with improved force rebalance means for sensing acceleration along an input axis, comprising:
a housing;
permanent magnet means mounted in said housing for producing a pair of oppositely directed radial magnetic fields in separated annular regions centered about and perpendicular to the input axis;
a bobbin having a pair of series connected oppositely wound circumferential coils centered on parallel planes having substantially the same separation as the annular regions of magnetic field produced by said permanent magnetic means;
a first disk separated by arcuate slits into outer, intermediate and inner rings, and further separated into two symmetrical portions, each portion of the outer ring being joined with the adjacent portion of the intermediate ring by a first torsion member aligned with a first hinge axis perpendicular to the input axis, each portion of the intermediate ring being joined with the adjacent portion of the inner ring by means of a second torsion member aligned with a second hinge axis parallel to the first hinge axis and on the opposite side of the input axis therefrom, the first and second hinge axes lying in a first plane perpendicular to the input axis;
a second disk separated by arcuate slits into outer, intermediate and inner rings, and further split into two symmetrical portions, each portion of the outer ring being joined with the adjacent portion of the intermediate ring by a third torsion member aligned with a third hinge axis parallel to the first hinge axis and lying in a second plane parallel to and spaced from the first plane, each portion of the intermediate ring being joined with the adjacent portion of the inner ring by a fourth torsion member aligned with a fourth hinge axis lying in the second plane, parallel to the third hinge axis and on the opposite side of the input axis therefrom;
clamping means for connecting said first disk between said housing and said bobbin at one end thereof and for connecting said second disk between said housing and said bobbin at the other end thereof so that said bobbin is centered about the input axis and the coils on the bobbin are positioned in the annular regions of magnetic field, said first and second disks permitting movement of said bobbin along the input axis;
pickoff means for producing a position signal indicative of displacement of said bobbin from a predetermined position within said housing;
servo amplifier means for producing a rebalance current in response to the position signal; and
electrical conductor means including portions of said first disk for supplying the rebalance current to the coils of said bobbin, whereby said bobbin is maintained at the predetermined position.

12. The accelerometer of claim 11 wherein said permanent magnet means comprises:
a permanent magnet aligned with the input axis;
a magnetically permeable sleeve surrounding said permanent magnet, said sleeve being substantially coextensive with said permanent magnet along the input axis; and a pair of radial outwardly projecting pole pieces on the ends of said permanent magnet and a pair of radial inward projections at the ends of said sleeve, said pole pieces and said inward projections each spanning a predetermined distance along the input axis greater than the length of each coil on said bobbin along the input axis, said permanent magnet means, said pole pieces and said sleeve cooperating to form a pair of annular gaps which contain said regions of uniform magnetic fiels surrounding the coils.

13. The accelerometer of claim 12 wherein:

the inner rings of said first and second disks are attached to opposite ends of said bobbin;

the outer rings of said first and second disks are attached to said housing, whereby said bobbin is constrained from movement transverse to the input axis;

first connection means is provided for electrically connecting the portions of the inner ring of said first disk to the coils on said bobbin; and second connection means is provided for electrically connecting said servo amplifier means to the portions of the outer ring of said first disk, whereby a rebalance current may be supplied to said coils.

14. The accelerometer of claim 13 wherein:

the outer, intermediate and inner rings of each of said first and second disks are each bonded between and electrically insulated from a pair of laminar ring members; and the laminar ring members bonded to the inner rings of said first and second disks form moveable capacitor plates of variable capacitance pickoff means having at least one fixed plate adjacent each moveable plate.

15. The accelerometer of claim 14 wherein said variable capacitance pickoff means comprises:

first and second variable capacitors formed by a first moveable capacitor plate on said first disk and each of a first pair of fixed plates on opposite sides of the first moveable plate;

third and fourth capacitors formed by a second moveable capacitor plate on said second disk and each of a second pair of fixed plates on opposite sides of the second moveable plate; and means connecting said first, second, third and fourth capacitors in a bridge circuit for producing the position signal indicative of displacement of said bobbin from the predetermined position within said housing.

16. The accelerometer of claim 15 wherein said first moveable capacitor plate comprising the laminar ring members bonded to the inner ring of said first disk are maintained at a zero reference potential, whereby said bridge circuit is shielded from effects of the rebalance current carried by the portions of said first disk to the coils on said bobbin.

17. The accelerometer of claim 12 wherein:

the outer rings of said first and second disks are attached to opposite ends of said bobbin;

the inner rings of said first and second disks are attached to said housing, whereby said bobbin is constrained from movement transverse the input axis;

first connection means is provided for electrically connecting the portions of the outer rings of said first disk to the coils of said bobbin; and second connection means is provided for electrically connecting said servo amplifier means to the portions of the inner ring of said first disk, whereby a rebalance current may be supplied to said coils.

18. The accelerometer of claim 17 wherein:

the outer, intermediate and inner rings of each of said first and second disks are each bonded between and electrically insulated from a pair of laminar ring members; and the laminar ring members bonded to the outer rings of said first and second disks form moveable capacitor plates of variable capacitance pickoff means having at least one fixed plate adjacent each moveable plate.

19. The accelerometer of claim 18 wherein said variable capacitance pickoff means comprises:

first and second variable capacitors formed by a first moveable capacitor plate on said first disk and each of a first pair of fixed plates on opposite sides of the first moveable plate;

third and fourth capacitors formed by a second moveable capacitor plate on said second disk and each of a second pair of fixed plates on opposite sides of the second moveable plate; and means connecting said first, second, third and fourth capacitors in a bridge circuit for producing the position signal indicative of displacement of said bobbin from the predetermined position within said housing.

20. The accelerometer of claim 19 wherein said first moveable capacitor plate comprising the laminar ring members bonded to the outer ring of said first disk are maintained at a zero reference potential, whereby said bridge circuit is shielded from effects of the rebalance current carried by the portions of said first disk to the coils on said bobbin.

* * * * *